(12) United States Patent
Johnson

(10) Patent No.: US 12,344,078 B2
(45) Date of Patent: Jul. 1, 2025

(54) WINDSHIELD PROTECTIVE DEVICE

(71) Applicant: Leslie Johnson, Crooks, SD (US)

(72) Inventor: Leslie Johnson, Crooks, SD (US)

( * ) Notice: Subject to any disclaimer, the term of this patent is extended or adjusted under 35 U.S.C. 154(b) by 206 days.

(21) Appl. No.: 18/138,540

(22) Filed: Apr. 24, 2023

(65) Prior Publication Data

US 2024/0351413 A1   Oct. 24, 2024

(51) Int. Cl.
*B60J 11/08* (2006.01)

(52) U.S. Cl.
CPC ..................... *B60J 11/08* (2013.01)

(58) Field of Classification Search
CPC ... B60J 11/08; B60J 11/06; B60J 7/102; B60J 7/104
USPC ............ 296/95.1, 96, 97.7, 77.1, 136.07; 160/370.21, 370.22, 370.23; 150/166, 150/168
See application file for complete search history.

(56) References Cited

U.S. PATENT DOCUMENTS

| | | | | |
|---|---|---|---|---|
| 2,341,236 A * | 2/1944 | Schnedler | ............... | B60J 11/08 296/95.1 |
| 3,874,437 A | 4/1975 | Black | | |
| 4,406,320 A * | 9/1983 | Bingham | ............... | B60J 11/08 160/370.21 |
| 4,948,192 A * | 8/1990 | Sohne | ............... | B60J 11/08 160/370.21 |
| 5,409,286 A | 4/1995 | Huang | | |
| 6,003,929 A * | 12/1999 | Birdsell | ............... | B60P 7/0876 52/3 |
| 6,682,123 B2 | 1/2004 | Burks | | |
| 6,916,059 B2 * | 7/2005 | Feinberg | ............... | B60J 5/00 296/145 |
| 7,204,280 B2 | 4/2007 | Allen | | |
| 7,431,375 B1 * | 10/2008 | Julius | ............... | B60J 11/06 160/370.21 |
| 7,823,953 B2 | 11/2010 | Haas | | |
| 8,132,603 B2 * | 3/2012 | Hogan | ............... | B60J 11/08 160/370.21 |
| 8,430,445 B1 * | 4/2013 | Williams | ............... | B60J 11/08 160/370.21 |
| 8,584,719 B2 * | 11/2013 | Rodriguez | ............... | B60J 11/06 160/370.21 |
| 8,757,240 B1 * | 6/2014 | Song | ............... | B60J 11/08 160/370.21 |
| 9,061,575 B2 | 6/2015 | Singleton | | |

(Continued)

FOREIGN PATENT DOCUMENTS

CA         3005015         12/2017

*Primary Examiner* — Amy R Weisberg
*Assistant Examiner* — Denise Lynne Esquivel

(57) ABSTRACT

A windshield protective device for protecting a windshield of a towed vehicle includes a panel, which has a size and a shape that are complementary to a windshield of a vehicle. The panel is resiliently flexible so that the panel is bendable to conform to contours of the windshield. A plurality of webbing straps is attached to a front face of the panel, with each webbing strap extending between and past opposed sides of the panel. The webbing straps thus are extendable around the windshield and into a passenger area of the vehicle. Fasteners are attached to each opposed end of each webbing strap. The fasteners are mutually couplable to secure the panel in a covering position upon the windshield, wherein the panel protects the windshield from damage and soiling.

16 Claims, 15 Drawing Sheets

(56) References Cited

U.S. PATENT DOCUMENTS

| | | | |
|---|---|---|---|
| 9,994,097 B2 * | 6/2018 | Ching | B60J 11/04 |
| 11,661,150 B1 * | 5/2023 | Stewart | B63B 19/02 |
| | | | 114/361 |
| 2007/0085372 A1 * | 4/2007 | Dhanray | B60J 11/00 |
| | | | 296/136.07 |
| 2017/0021710 A1 | 1/2017 | Mansueto | |

* cited by examiner

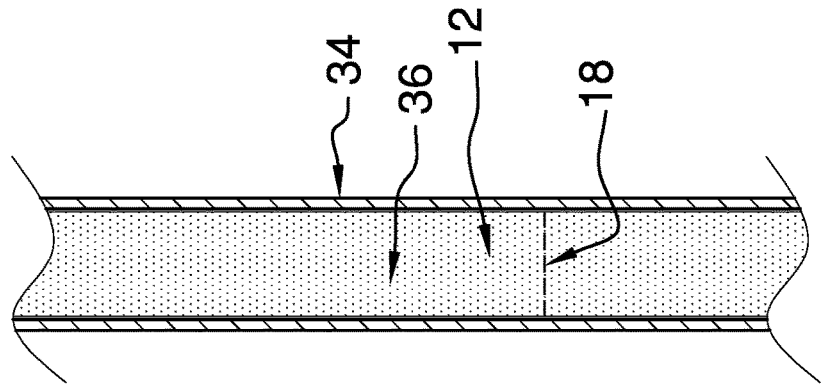
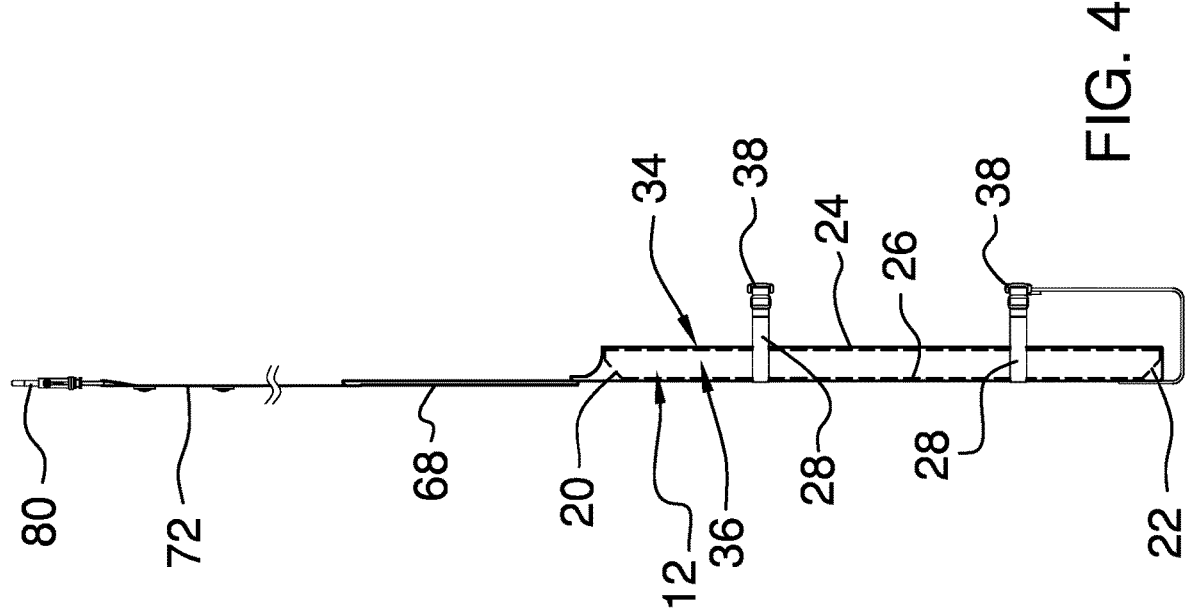
FIG. 5
FIG. 4

WINDSHIELD PROTECTIVE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to windshield protectors and more particularly pertains to a new windshield protector for protecting a windshield of a towed vehicle, and in particular All-Terrain Vehicles (ATVs). ATVs typically are towed in a rearward facing manner upon trailers.

(2) Description of Related Art Including Information Disclosed Under 37 CFR 1.97 and 1.98

The prior art relates to windshield protectors and does not address a windshield protector that allows for an ATV to be towed in a forward facing manner, which simplifies loading and unloading of the ATV.

BRIEF SUMMARY OF THE INVENTION

An embodiment of the disclosure meets the needs presented above by generally comprising a panel, which has a size and a shape that are complementary to a windshield of a vehicle. The panel is resiliently flexible so that the panel is bendable to conform to contours of the windshield. A plurality of webbing straps is attached to a front face of the panel, with each webbing strap extending between and past opposed sides of the panel. The webbing straps thus are extendable around the windshield and into a passenger area of the vehicle. Each fastener of a plurality of fasteners is attached to a respective opposed end of a respective webbing strap so that each opposed end of each webbing strap is fitted with a fastener. The fasteners are mutually couplable to secure the panel in a covering position upon the windshield, wherein the panel is configured to protect the windshield from damage and soiling.

An embodiment of the disclosure includes a windshield protective system comprising a vehicle, which has a windshield to which a windshield protective device, per the disclosure above, has been fitted. A panel of the windshield protective device has been secured in a covering position upon the windshield using fasteners and is configured to protect the windshield from damage and soiling.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a side view of an embodiment of the disclosure.

FIG. 5 is a cross-sectional view of an embodiment of the disclosure.

DETAILED DESCRIPTION OF THE INVENTION

Figure 1:
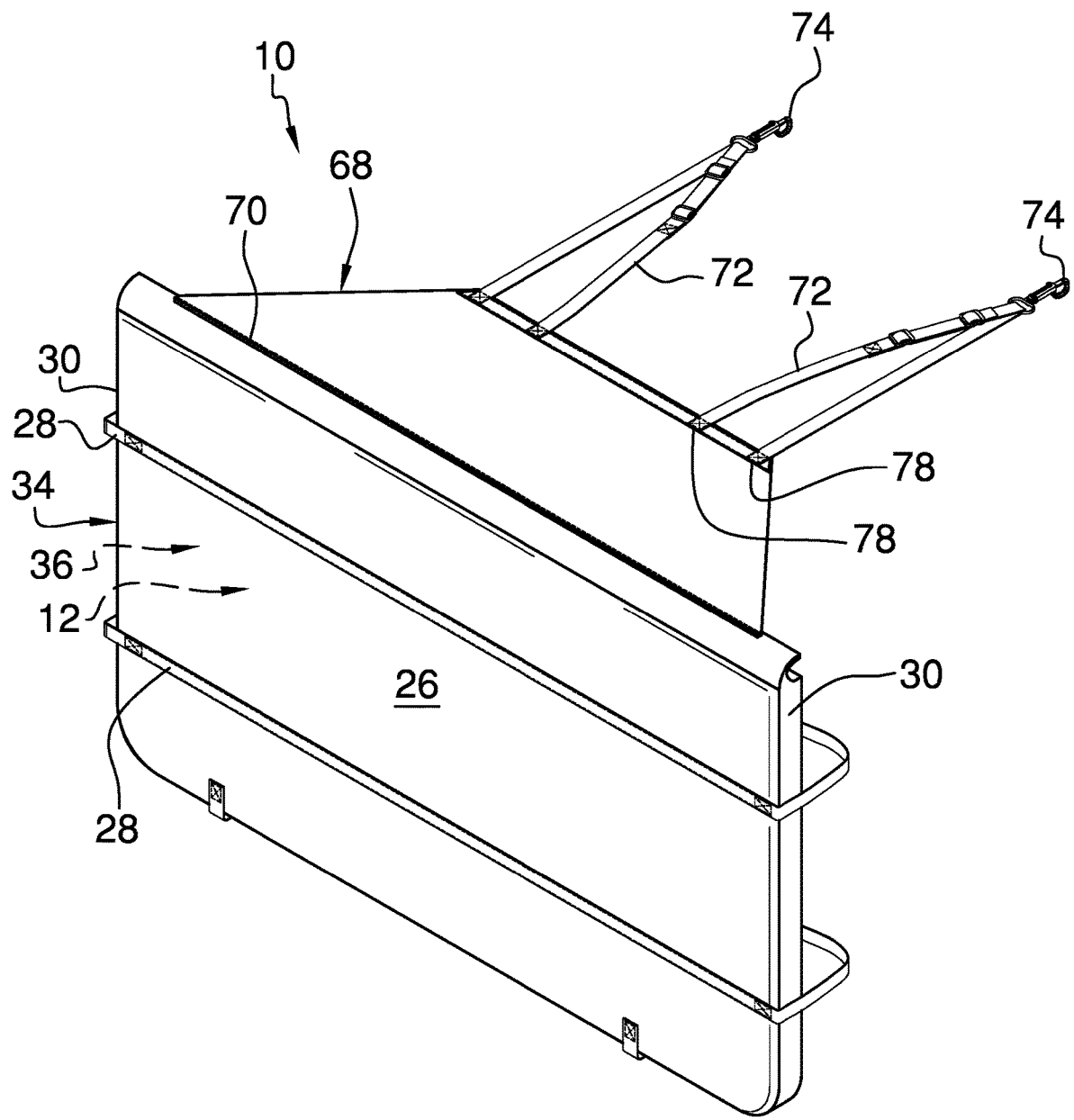
FIG. 1 is an isometric perspective view of a windshield protective device according to an embodiment of the disclosure.

With reference now to the drawings, and in particular to FIGS. 1 through 16 thereof, a new windshield protector embodying the principles and concepts of an embodiment of the disclosure and generally designated by the reference numeral 10 will be described.

As best illustrated in FIGS. 1 through 16, the windshield protective device 10 generally comprises a panel 12, which has a size and a shape that are complementary to a windshield 14 of a vehicle 16. The panel 12 is resiliently flexible and thus is bendable to conform to contours of the windshield 14. The panel 12 typically will comprise foamed elastomer, such as, but not limited, expanded polyethylene, expanded polystyrene, or the like. The panel 12 has a thickness 18 of 1.27 to 3.81 cm, and more particularly, the thickness 18 of the panel 12 may be from 1.90 to 3.18 cm. A top edge 20 and a bottom edge 22 of the panel 12 are beveled so that a rear face 24 of the panel 12 is circumferentially larger than a front face 26 of the panel 12. As will become apparent, the top edge 20 and the bottom edge 22 of the panel 12 being beveled renders the panel 12 more aerodynamic.

Figure 2:
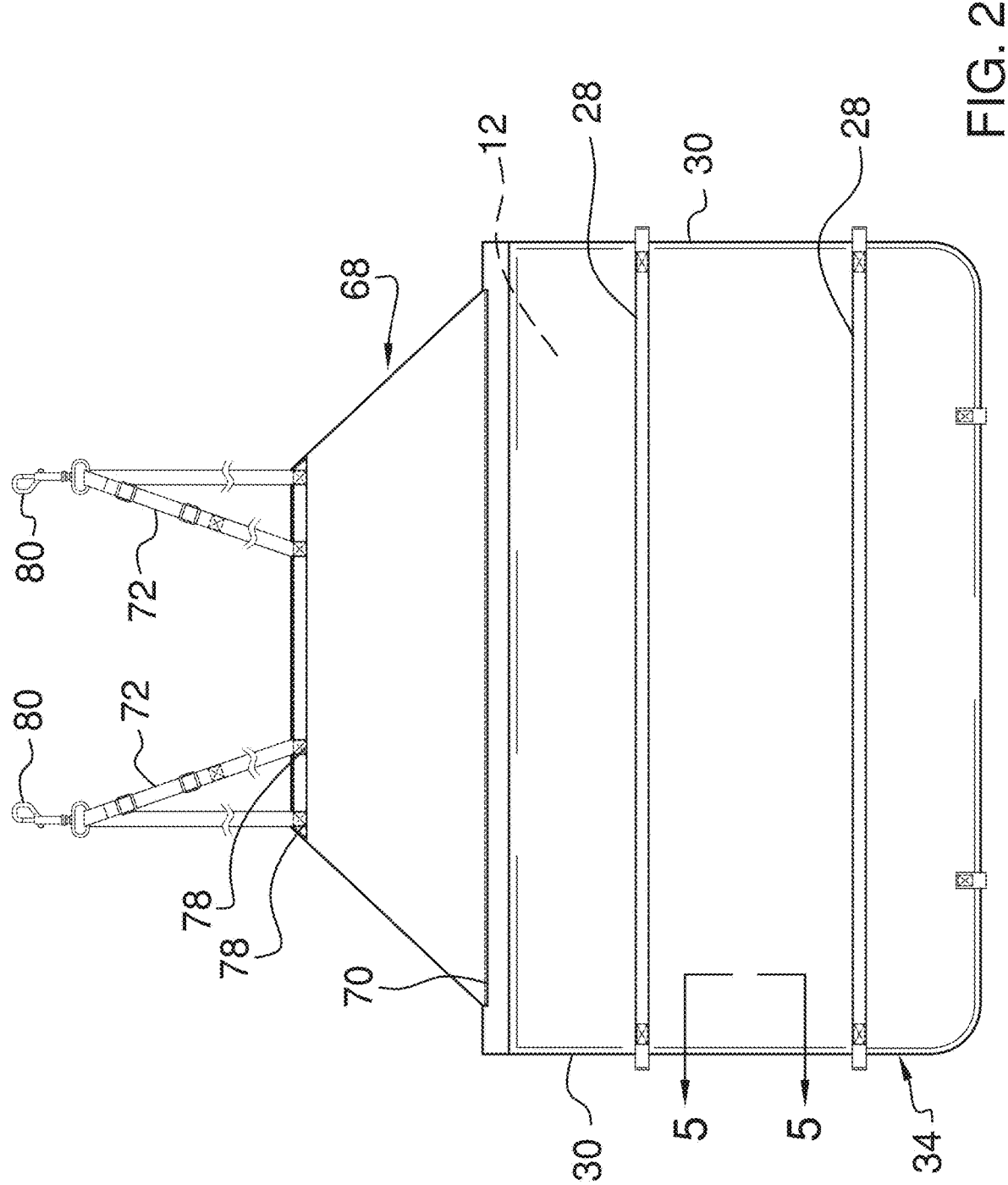
FIG. 2 is a front view of an embodiment of the disclosure.
Figure 9:
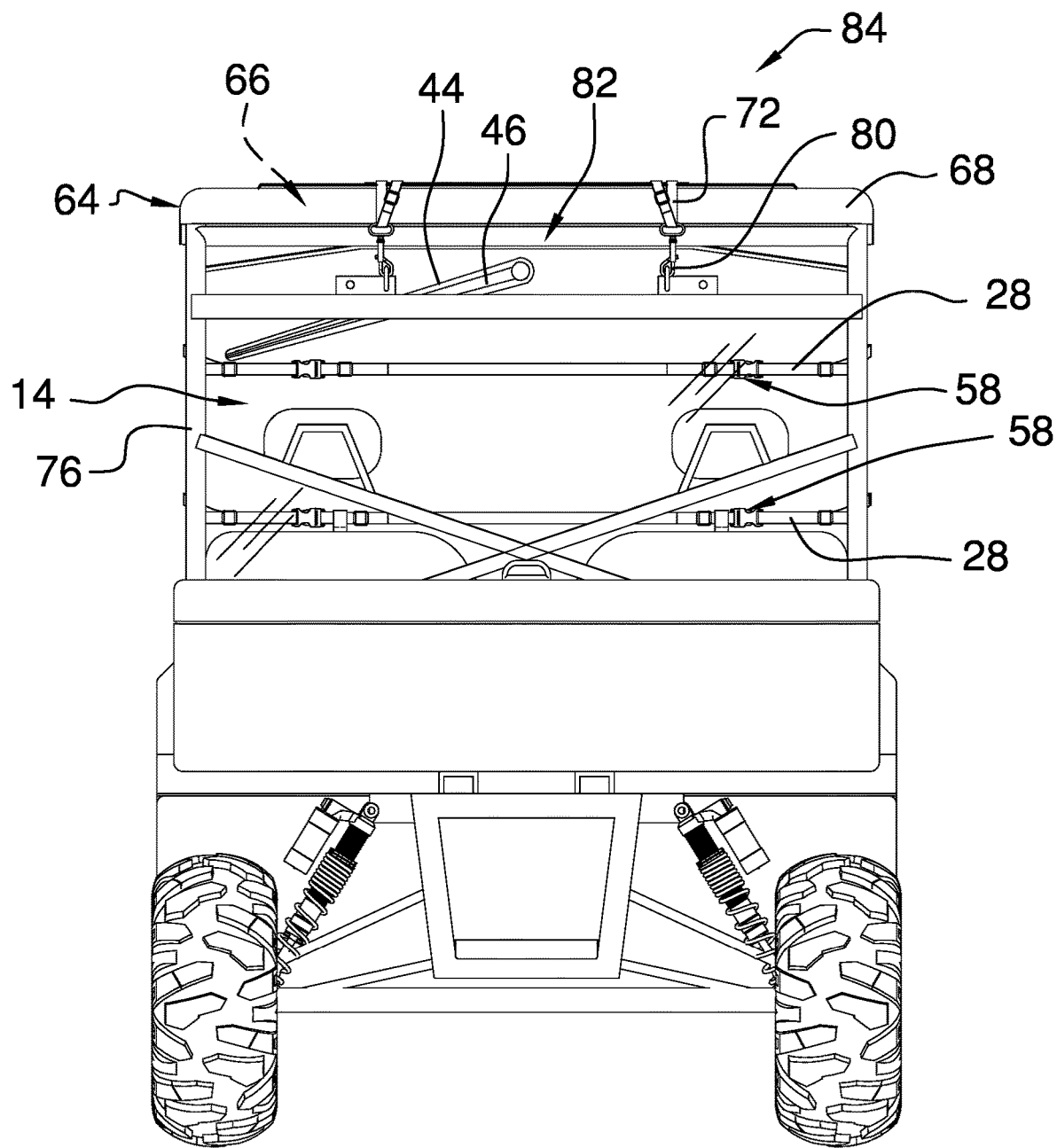
FIG. 9 is a rear in-use view of an embodiment of the disclosure.

A plurality of webbing straps 28 is attached to the front face 26 of the panel 12, with each webbing strap 28 extending between and past opposed sides 30 of the panel 12. The webbing straps 28 thus are extendable around the windshield 14 and into a passenger area 32 of the vehicle 16, as is shown in FIG. 9. As is shown in FIG. 2, the plurality of webbing straps 28 comprises two webbing straps 28, although the present invention also anticipates the plurality of webbing straps 28 comprising more than two webbing straps 28.

The windshield protective device 10 may include a shell 34, which covers the panel 12 with the panel 12 substantially occupies an internal space 36 that is defined by the shell 34. In this embodiment, the webbing straps 28 are attached to the shell 34. The shell 34 may comprise vinyl backed canvas, or other material that is both rugged and resistant to water penetration, such as, but not limited to, natural and synthetic fabrics that are one or both of laminated and coated with a waterproofing material, such as rubber, polyvinyl chloride, polyurethane, silicone elastomer, fluoropolymers, and wax.

Figure 7:
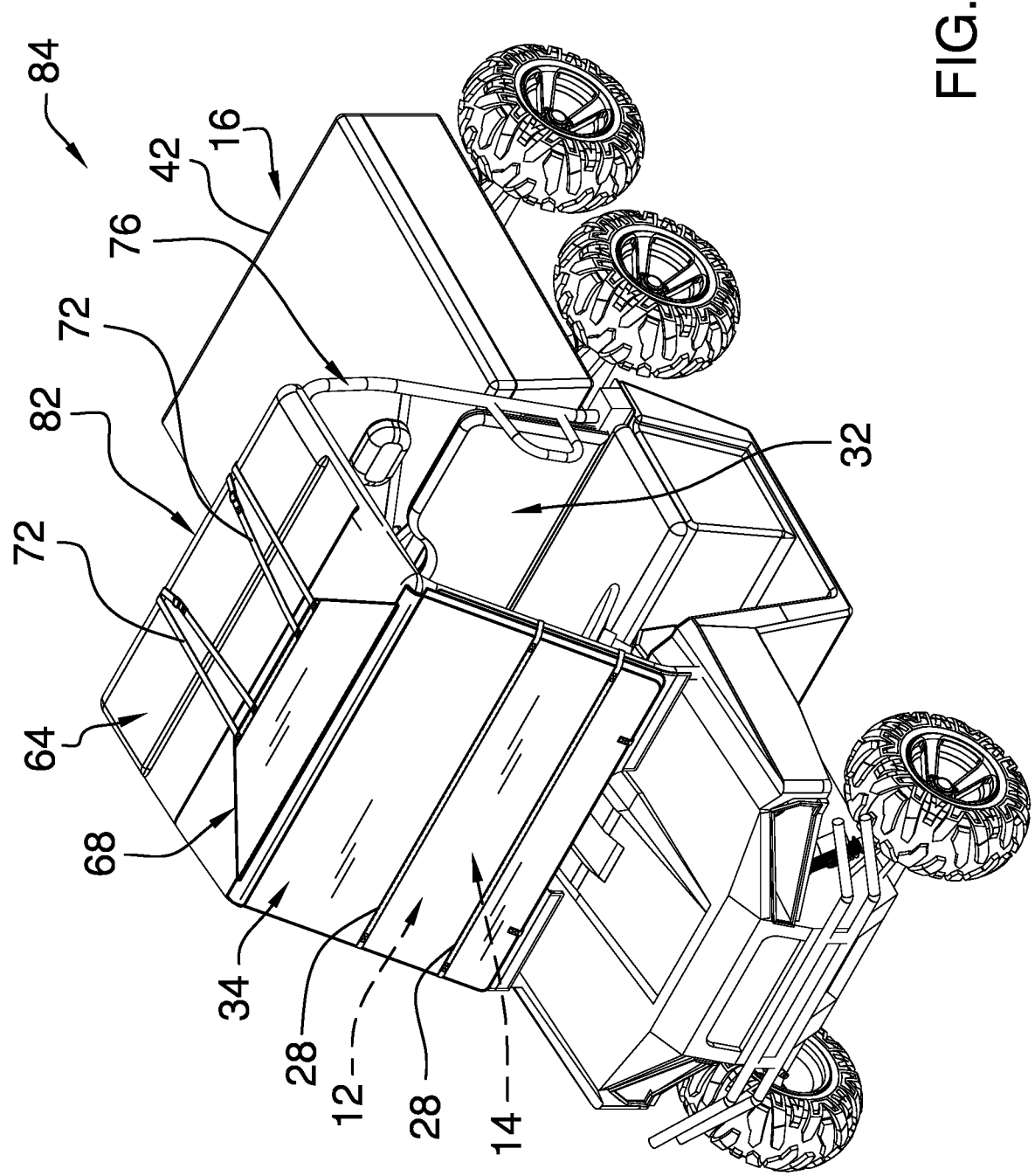
FIG. 7 is an in-use view of an embodiment of the disclosure.
Figure 8:
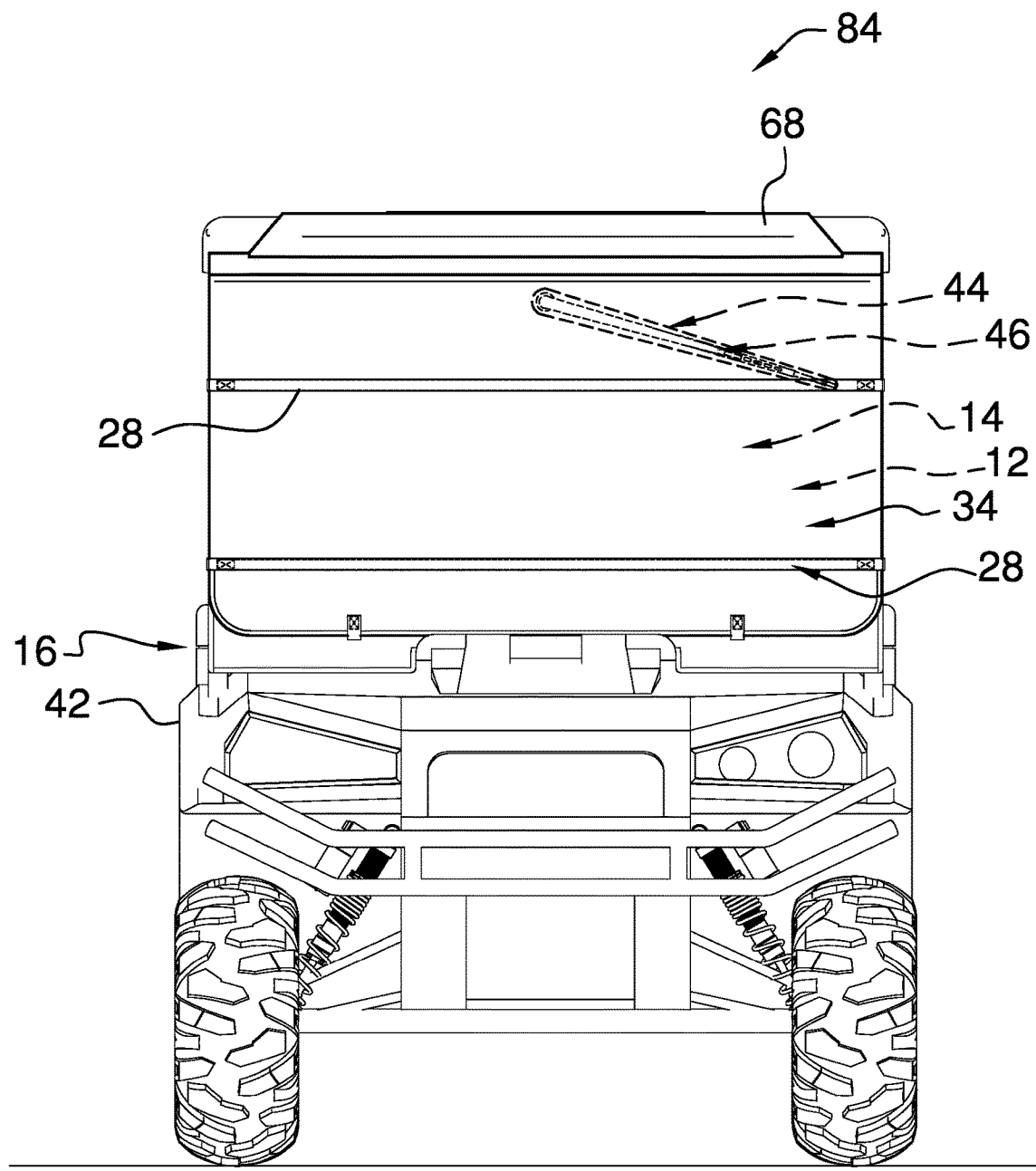
FIG. 8 is a front in-use view of an embodiment of the disclosure.

Each fastener 38 of a plurality of fasteners 38 is attached to a respective opposed end 40 of a respective webbing strap 28 so that each opposed end 40 of each webbing strap 28 is fitted with a fastener 38. The fasteners 38 are mutually couplable to secure the panel 12 in a covering position upon the windshield 14, as is shown in FIG. 7, wherein the panel 12 is configured to protect the windshield 14 from damage and soiling. The present invention is anticipated to be of particular use in protecting a windshield 14 of a towed vehicle 16, such as an All-Terrain Vehicle (ATV) 42, which typically are towed from a storage location to another location for use. ATVs 42 typically are towed in a rear facing manner, which entails backing an ATV 42 onto a trailer. The windshield protective device 10 allows the ATV 42 to be towed in a forward facing manner, which allows the ATV 42 to be driven in a forward direction onto the trailer and then backed off the trailer for unloading, a much safer protocol. The windshield protective device 10 protects the windshield 14 from damage by flying debris, hail, or the like, and protects the windshield 14 from by mud, road grime, or the like, while the vehicle 16 is being towed. The windshield protective device 10 also can be left is place if the vehicle 16 is to be stored exposed to the elements.

Figure 6:
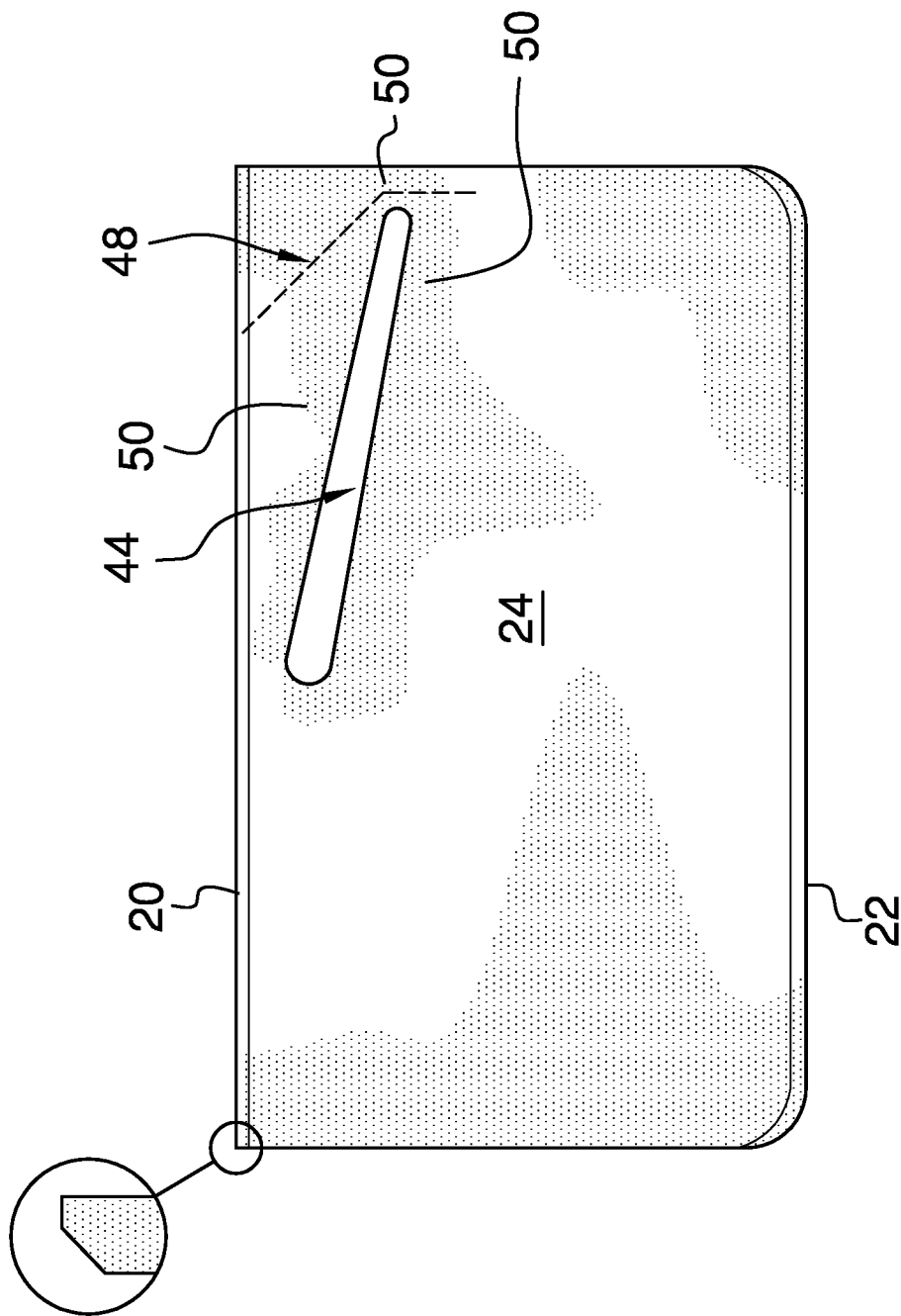
FIG. 6 is a detail view of an embodiment of the disclosure.

The rear face 24 of the panel 12 may have an elongate recess 44 positioned therein. The elongate recess 44 has a size and a shape that are complementary to a windshield wiper 46 of the vehicle 16. The recess is configured to receive the windshield wiper 46 as the panel 12 is positioned in the covering position upon the windshield 14. The panel 12 thus protects the windshield wiper 46 from damage while the vehicle 16 is being towed. The elongate recess 44 weakens the panel 12, so, as is shown in FIG. 6, a wire 48 is positioned in the panel 12 proximate to the elongate recess 44 and provides a structural connection between sections 50 of the panel 12 adjacent to the elongate recess 44. Other connecting means in place of the wire 48 also are anticipated, such as, but not limited to, plastic plates, plastic rods, or the like.

The windshield protective device 10 includes a plurality of extender straps 52, which is numerically equivalent to the plurality of webbing straps 28. Respective fasteners 38 are attached to the plurality of extender straps 52 so that each opposing end 54 of each extender strap 52 is fitted with a fastener 38. Each extender strap 52 is connectable between the fasteners 38 attached to the opposed ends 40 of a respective webbing strap 28, as is shown in FIG. 9. The fasteners 38 attached to the webbing straps 28 may comprise first elements 56 of side release buckles 58 and the fasteners 38 attached to the extender straps 52 may comprise second elements 60 of the side release buckles 58. The present invention also anticipates the fasteners 38 comprising other fastening means, such as, but not limited to, hook and loop fasteners, snap closures, or the like.

A plurality of webbing adjustment buckles 62 is attached to the webbing straps 28 and to the extender straps 52 so that each fastener 38 is paired with a respective webbing adjustment buckle 62. The webbing straps 28 and the extender straps 52 thus are selectively length adjustable. The webbing adjustment buckles 62 being attached proximate to each fastener 38 allows for optimal convenience in adjusting the lengths of the webbing straps 28 and the extender straps 52. Fewer webbing adjustment buckles 62 also could suffice in allow length adjustment, for example, each extender strap 52 could be fitted with a single webbing adjustment buckle 62 and would allow for securing of the panel 12 in position over the windshield 14.

Many ATVs 42 are configured with a roof panel 64 and have a gap 66 between the windshield 14 and the roof panel 64. The windshield protective device 10 also may include a flap 68, which is attached to and which extends from an upper end 70 of the shell 34. A set of top straps 72 is attached to the flap 68. A plurality of couplers 74 is attached to the set of top straps 72 so that each top strap 72 is fitted with a coupler 74. The couplers 74 are selectively couplable to a frame 76 of the vehicle 16 so that the flap 68 is secured in a closing position over the gap 66. The flap 68 thus is configured to limit lifting of the roof panel 64 during forward towing of the vehicle 16.

Figure 3:
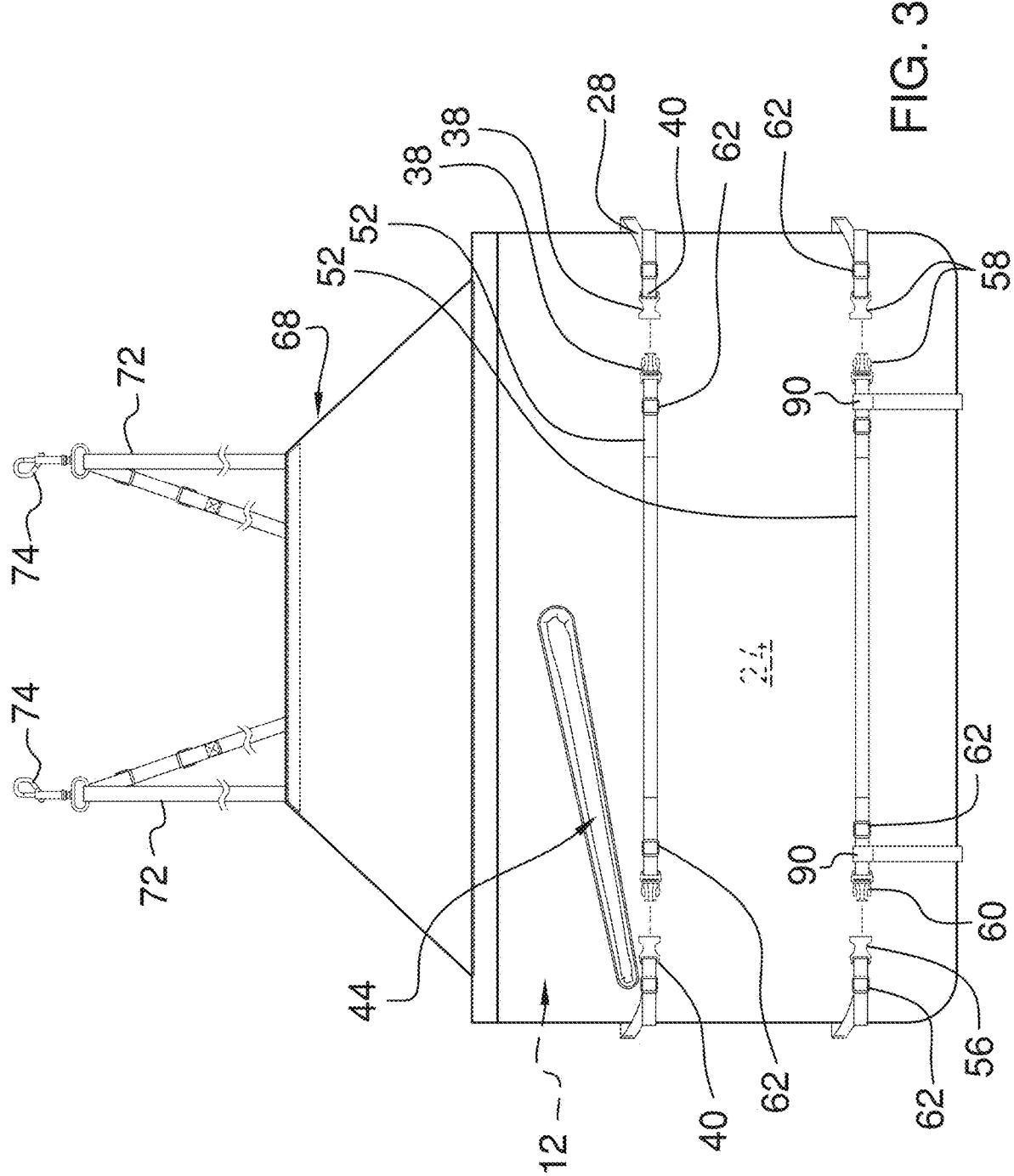
FIG. 3 is a rear view of an embodiment of the disclosure.
Figure 10:
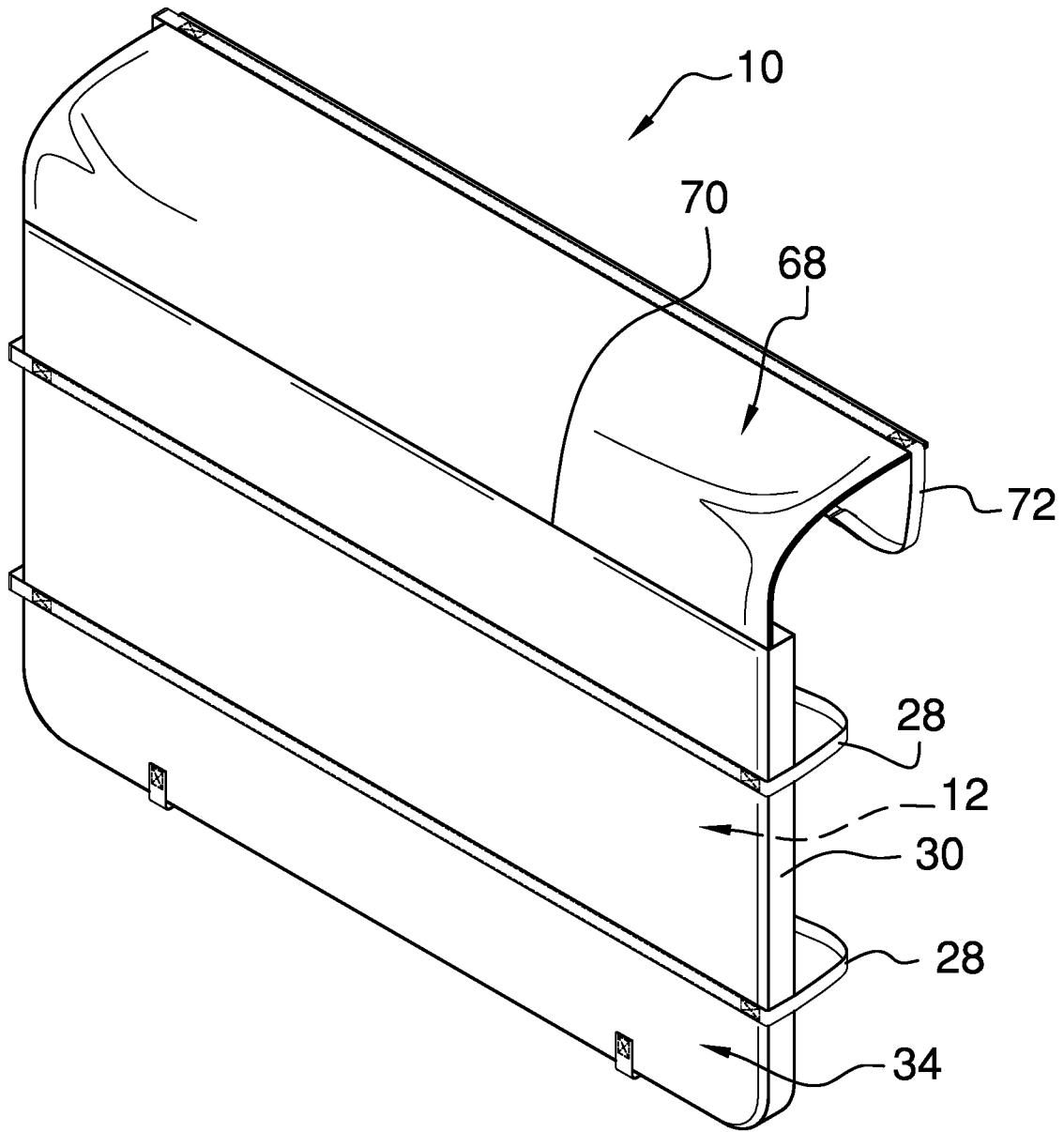
FIG. 10 is an isometric perspective view of an embodiment of the disclosure.
Figure 11:
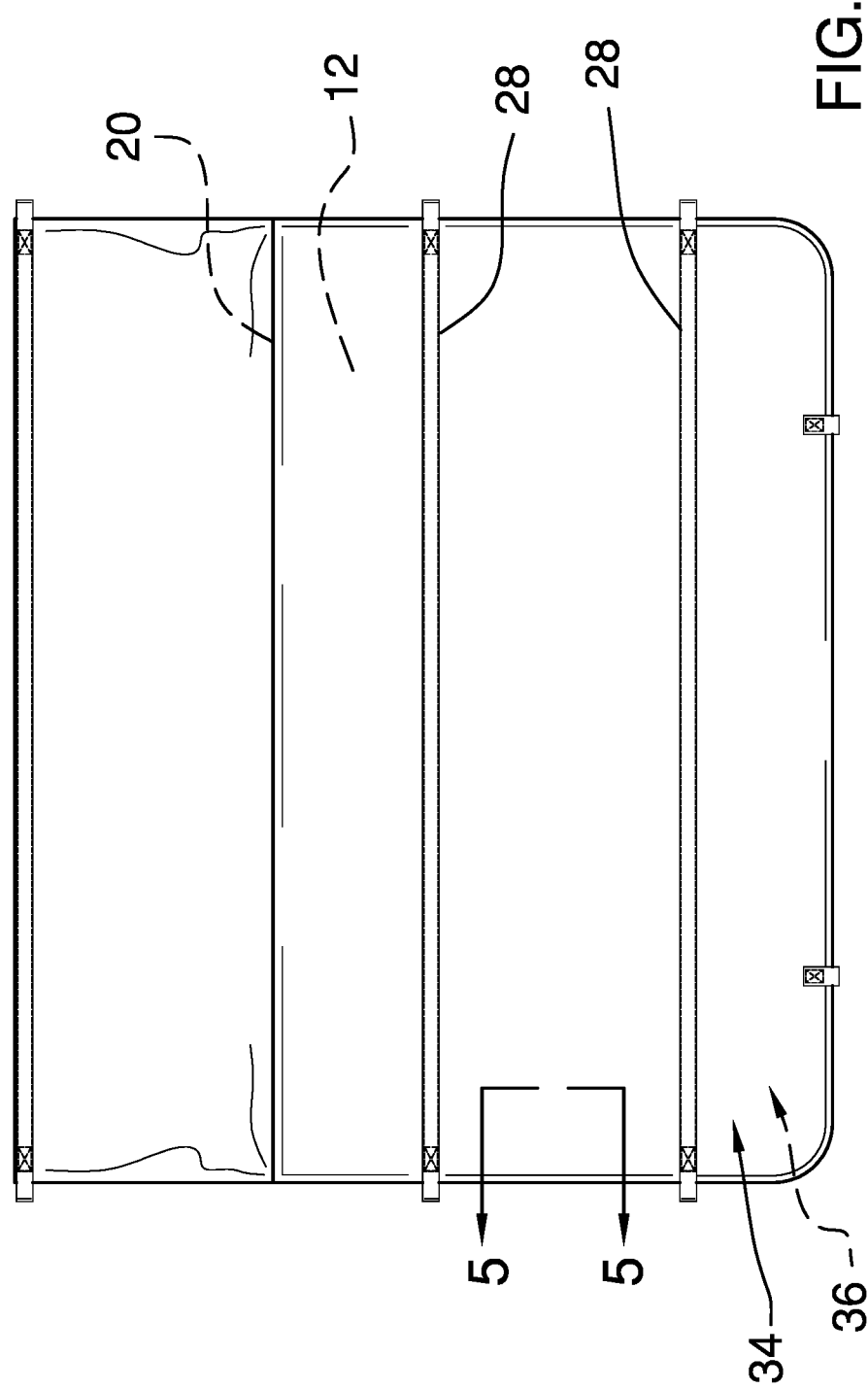
FIG. 11 is a front view of an embodiment of the disclosure.
Figure 12:
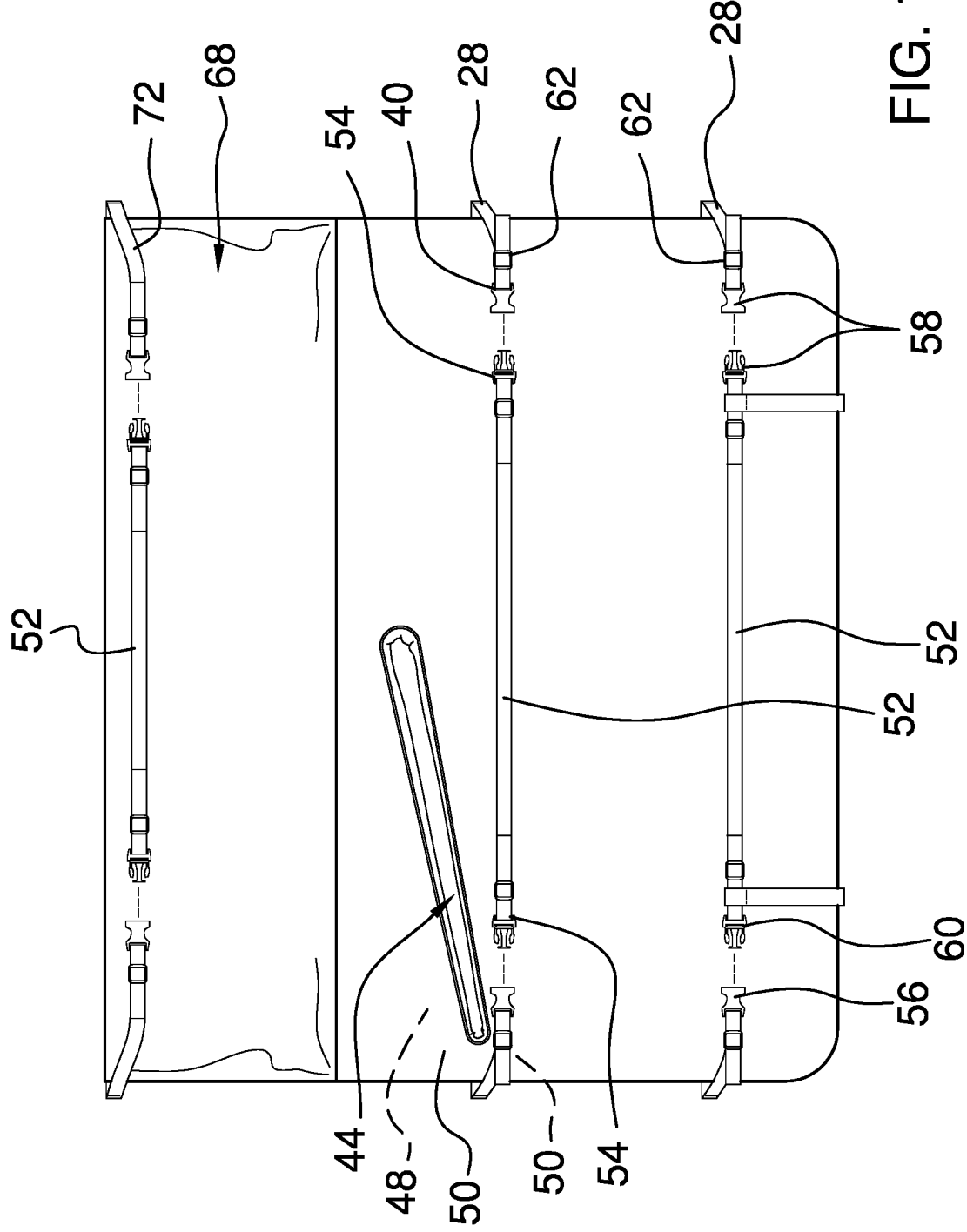
FIG. 12 is a rear view of an embodiment of the disclosure.
Figure 13:
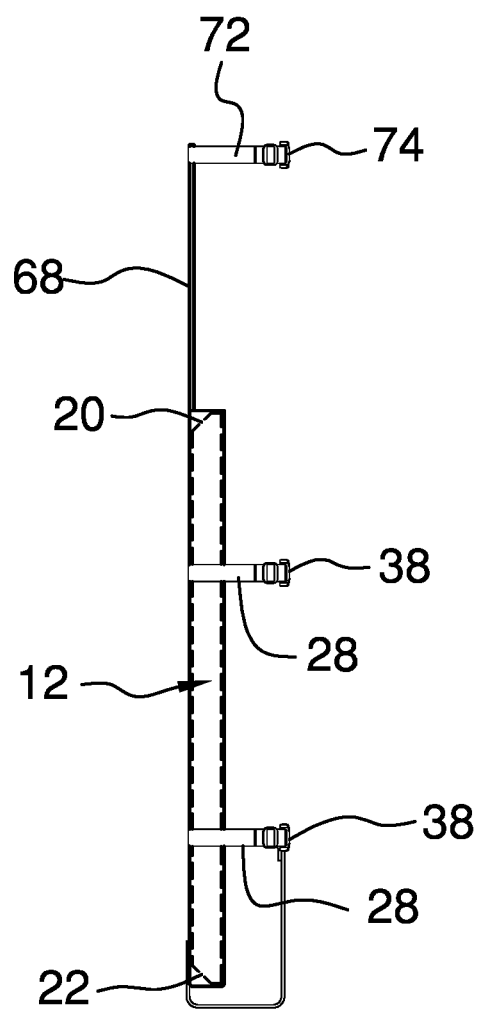
FIG. 13 is a side view of an embodiment of the disclosure.
Figure 14:
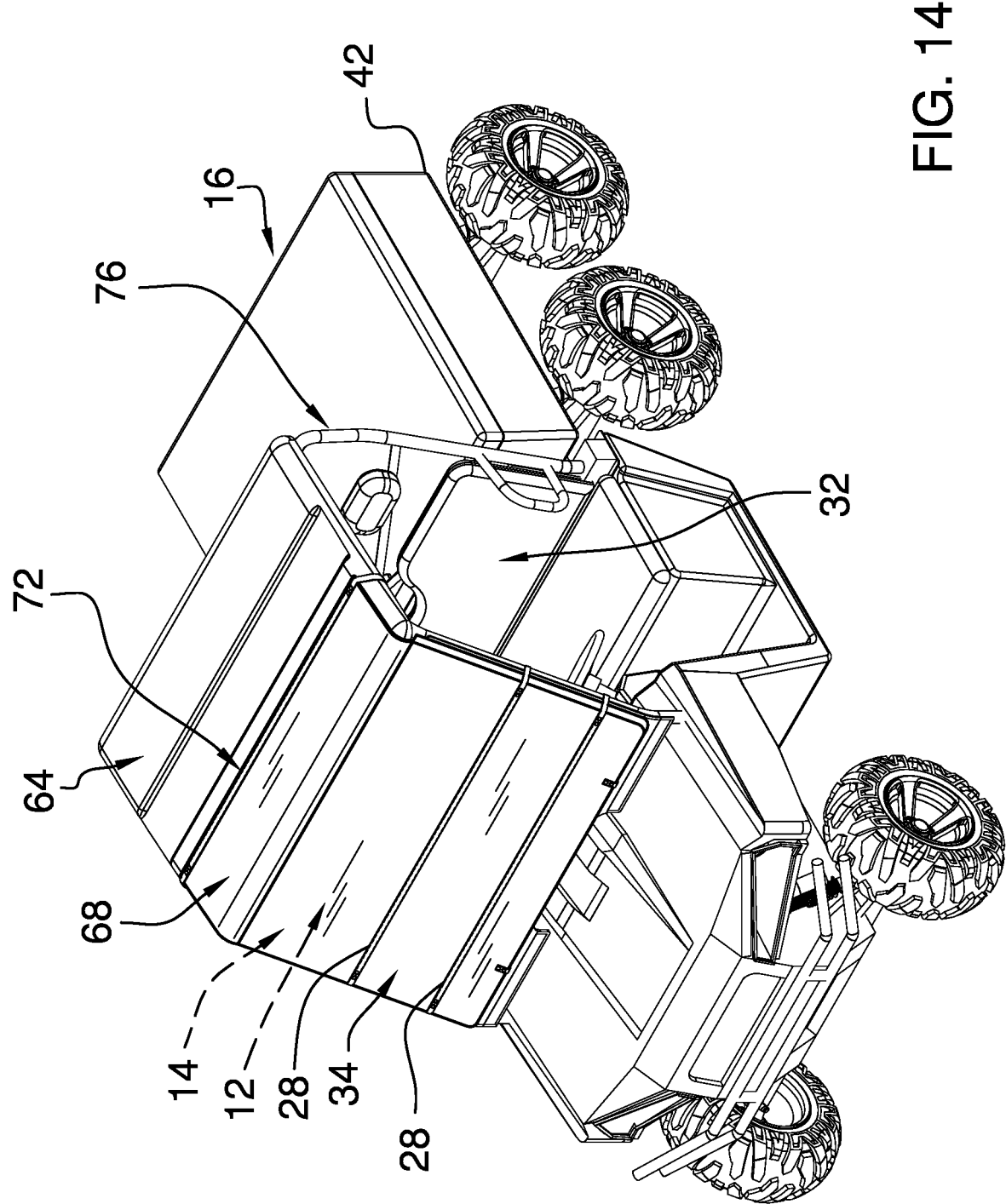
FIG. 14 is an in-use view of an embodiment of the disclosure.
Figure 15:
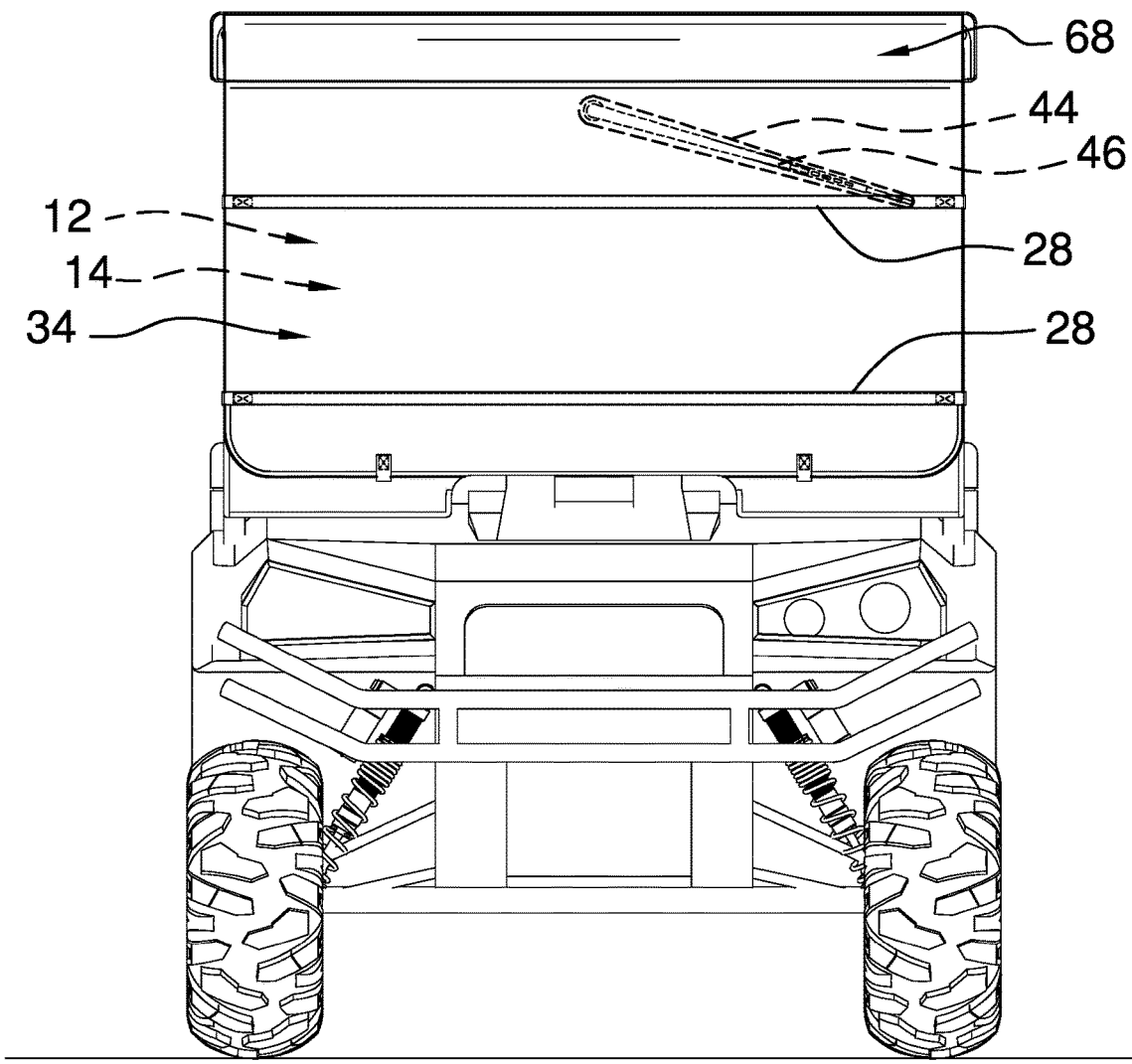
FIG. 15 is a front in-use view of an embodiment of the disclosure.
Figure 16:
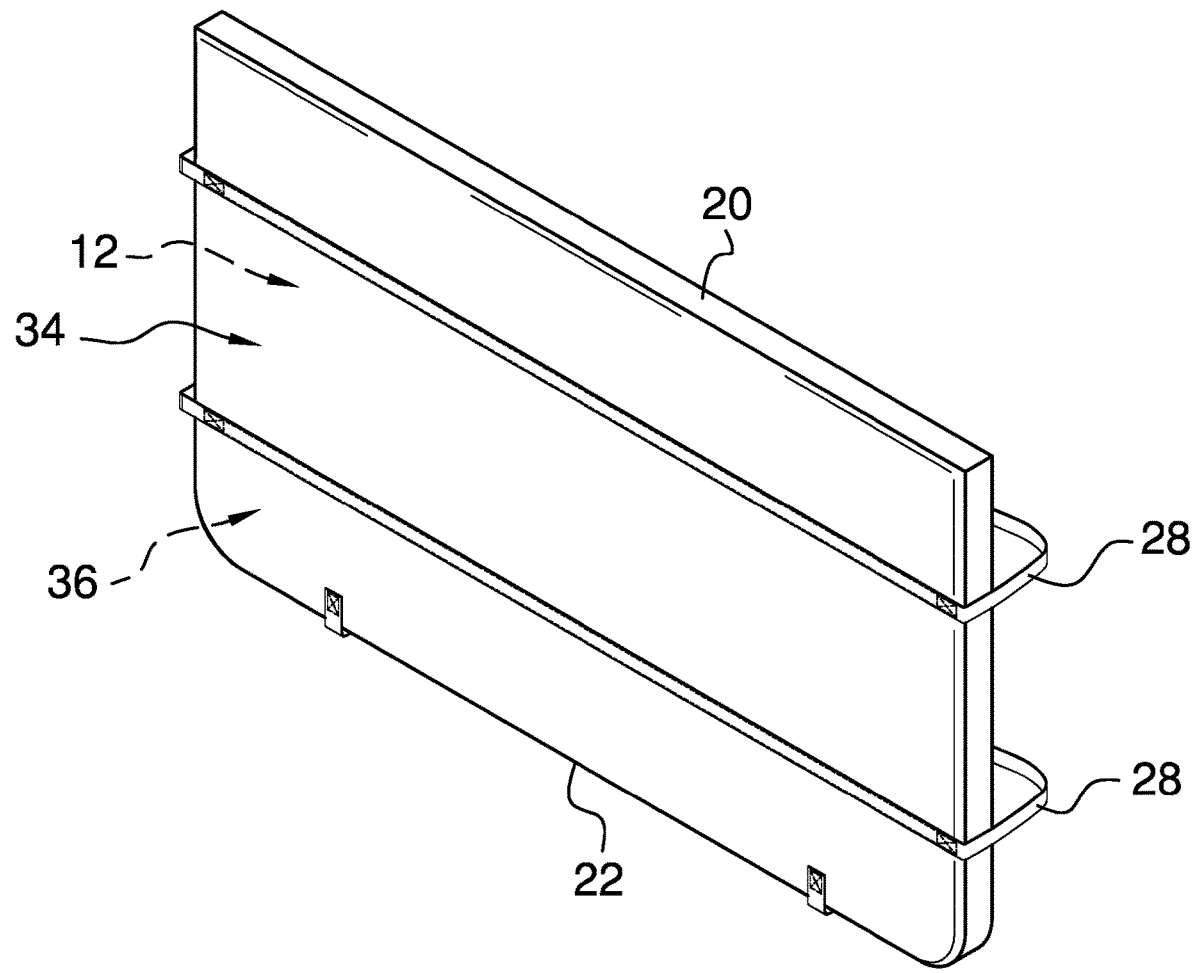
FIG. 16 is an isometric perspective view of an embodiment of the disclosure.

ATVs 42 are manufactured in a variety of makes and models having a variety of windshields 14 and roof panels 64. Thus, the windshield protective device 10 is anticipated to have a variety of configurations to match the various makes and models of ATVs 42. Two such configurations for the flap 68 are shown in FIGS. 3 and 10. In FIG. 3, the flap 68 is trapezoidal and the set of top straps 72 comprises two top straps 72. The opposite ends 78 of each top strap 72 are attached to the flap 68 and a clip 80 is attached to the top strap 72, allowing the top strap 72 to be attached to a rear bar 82 of the frame 76, as is shown in FIG. 9. In FIG. 10, the flap 68 is rectangular and there is a single top strap 72, which is configured as are the webbing straps 28, thereby allowing the top strap 72 to be fastened, as is shown in FIGS. 14 and 15, in the same manner as is used for the panel 12.

The present invention also anticipates a windshield protective system 84 comprising a vehicle 16, which has a windshield 14 to which a windshield protective device 10 has been fitted. A panel 12 of the windshield protective device 10 has been secured in a covering position upon the windshield 14 using fasteners 38 and is configured to protect the windshield 14 from damage and soiling. The windshield protective device 10 may further comprise a shell 34, which covers the panel 12, and a flap 68, which is attached to and which extends from an upper end 68 of the shell 34. A set of top straps 72 is attached to the flap 68 and is attached with to a frame 76 of the vehicle 16 so that the flap 68 is secured in a closing position over a gap 66 between the windshield 14 and a roof panel 64 of the vehicle 16. The flap 68 thus is configured to limit lifting of the roof panel 64 during forward towing of the vehicle 16.

In use, a panel 12 is positioned upon a windshield 14 of a vehicle 16 and webbing straps 28 are extended from the panel 12 into a passenger area 32 of the vehicle 16, where they are mutually attached to secure the panel 12 in a covering position over the windshield 14. The flap 68 is extended over a gap 66 between the windshield 14 and a roof panel 64 of the vehicle 16 and secured in place to limit lifting of the roof panel 64 during forward towing of the vehicle 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A windshield protective device comprising:
   a panel having a size and a shape complementary to a windshield of a vehicle, the panel being resiliently flexible, such that the panel is bendable to conform to contours of the windshield;
   a plurality of webbing straps attached to a front face of the panel, each webbing strap of the plurality of webbing straps extending between and past opposed sides of the panel, such that the webbing straps of the plurality of webbing straps are extendable around the windshield and into a passenger area of the vehicle;
   a plurality of fasteners, each fastener of the plurality of fasteners being attached to a respective opposed end of a respective webbing strap of the plurality of webbing straps, such that each opposed end of each webbing strap is fitted with a fastener, the fasteners of the plurality of fasteners being mutually couplable for securing the panel in a covering position upon the windshield, wherein the panel is configured for protecting the windshield from damage and soiling;
   a rear face of the panel has an elongate recess positioned therein, the elongate recess having a size and a shape complementary to a windshield wiper of the vehicle, wherein the recess is configured for receiving the windshield wiper as the panel is positioned in the covering position upon the windshield; and
   a wire, the wire being positioned in the panel proximate to the elongate recess, such that the wire provides a structural connection between sections of the panel adjacent to the elongate recess.

2. The windshield protective device of claim 1, wherein the panel comprises foamed elastomer.

3. The windshield protective device of claim 1, wherein the panel has a thickness of 1.27 to 3.81 cm.

4. The windshield protective device of claim 3, wherein the thickness of the panel is from 1.90 to 3.18 cm.

5. The windshield protective device of claim 1, wherein a top edge and a bottom edge of the panel are beveled, such that a rear face of the panel is circumferentially larger than the front face of the panel.

6. The windshield protective device of claim 1, wherein the plurality of webbing straps comprises two webbing straps.

7. The windshield protective device of claim 1, further including a plurality of extender straps numerically equivalent to the plurality of webbing straps, respective fasteners of the plurality of fasteners being attached to the plurality of extender straps, such that each opposing end of each extender strap of the plurality of extender straps is fitted with a fastener, each extender strap of the plurality of extender straps being connectable between the fasteners attached to the opposed ends of a respective webbing strap of the plurality of webbing straps.

8. The windshield protective device of claim 7, wherein:
   the fasteners of the plurality of fasteners attached to the webbing straps of the plurality of webbing straps comprise first elements of side release buckles; and
   the fasteners of the plurality of fasteners attached to the extender straps of the plurality of extender straps comprise second elements of the side release buckles.

9. The windshield protective device of claim 7, further including a plurality of webbing adjustment buckles attached to the webbing straps of the plurality of webbing straps and the extender straps of the plurality of extender straps, such that each fastener of the plurality of fasteners is paired with a respective webbing adjustment buckle of the plurality of webbing adjustment buckles, such that the webbing straps of the plurality of webbing straps and the extender straps of the plurality of extender straps are selectively length adjustable.

10. The windshield protective device of claim 1, further including a shell covering the panel, such that the panel substantially occupies an internal space defined by the shell, the straps of the plurality of webbing straps being attached to the shell.

11. The windshield protective device of claim 10, wherein the shell comprises vinyl backed canvas.

12. The windshield protective device of claim 10, further including:
   a flap attached to and extending from an upper end of the shell;
   a set of top straps attached to the flap; and
   a plurality of couplers attached to the top straps of the set of top straps, such that each top strap is fitted with a coupler, the couplers of the plurality of couplers being selectively couplable to a frame of the vehicle, such that the flap is secured in a closing position over a gap between the windshield and a roof panel of the vehicle, wherein the flap is configured for limiting lifting of the roof panel during forward towing of the vehicle.

13. A windshield protective system comprising:
   a vehicle having a windshield;

a panel having a size and a shape complementary to a windshield of a vehicle, the panel being resiliently flexible, such that the panel is bendable to conform to contours of the windshield;

a plurality of webbing straps attached to a front face of the panel, each webbing strap of the plurality of webbing straps extending between and past opposed sides of the panel and into a passenger area of the vehicle; and a plurality of fasteners, each fastener of the plurality of fasteners being attached to a respective opposed end of a respective webbing strap of the plurality of webbing straps, such that each opposed end of each webbing strap is fitted with a fastener, the fasteners of the plurality of fasteners being mutually coupled, such that the panel is secured in a covering position upon the windshield, wherein the panel is configured for protecting the windshield from damage and soiling;

a rear face of the panel has an elongate recess positioned therein, the elongate recess having a size and a shape complementary to a windshield wiper of the vehicle, wherein the recess is configured for receiving the windshield wiper as the panel is positioned in the covering position upon the windshield; and a wire, the wire being positioned in the panel proximate to the elongate recess, such that the wire provides a structural connection between sections of the panel adjacent to the elongate recess.

14. The windshield protective system of claim 13, further including a shell covering the panel, such that the panel substantially occupies an internal space defined by the shell, the straps of the plurality of webbing straps being attached to the shell.

15. The windshield protective system of claim 14, further including:

a flap attached to and extending from an upper end of the shell;

a set of top straps attached to the flap; and a plurality of couplers attached to the top straps of the set of top straps, such that each top strap is fitted with a coupler, the couplers being fastened to a frame of the vehicle, such that the flap is secured in a closing position over a gap between the windshield and a roof panel of the vehicle, wherein the flap is configured for limiting lifting of the roof panel during forward towing of the vehicle.

16. A windshield protective device comprising:

a panel having a size and a shape complementary to a windshield of a vehicle, the panel being resiliently flexible, such that the panel is bendable to conform to contours of the windshield, the panel comprising foamed elastomer, the panel having a thickness of 1.27 to 3.81 cm, a top edge and a bottom edge of the panel being beveled, such that a rear face of the panel is circumferentially larger than a front face of the panel;

a rear face of the panel having an elongate recess positioned therein, the elongate recess having a size and a shape complementary to a windshield wiper of the vehicle, wherein the recess is configured for receiving the windshield wiper as the panel is positioned in a covering position upon the windshield;

a wire, the wire being positioned in the panel proximate to the elongate recess, such that the wire provides a structural connection between sections of the panel adjacent to the elongate recess;

a plurality of webbing straps attached to the front face of the panel, each webbing strap of the plurality of webbing straps extending between and past opposed sides of the panel, such that the webbing straps of the plurality of webbing straps are extendable around the windshield and into a passenger area of the vehicle, the plurality of webbing straps comprising two webbing straps;

a plurality of fasteners, each fastener of the plurality of fasteners being attached to a respective opposed end of a respective webbing strap of the plurality of webbing straps, such that each opposed end of each webbing strap is fitted with a fastener, the fasteners of the plurality of fasteners being mutually couplable for securing the panel in the covering position upon the windshield, wherein the panel is configured for protecting the windshield from damage and soiling;

a plurality of extender straps numerically equivalent to the plurality of webbing straps, respective fasteners of the plurality of fasteners being attached to the plurality of extender straps, such that each opposing end of each extender strap of the plurality of extender straps is fitted with a fastener, each extender strap of the plurality of extender straps being connectable between the fasteners attached to the opposed ends of a respective webbing strap of the plurality of webbing straps, the fasteners of the plurality of fasteners attached to the webbing straps of the plurality of webbing straps comprising first elements of side release buckles, the fasteners of the plurality of fasteners attached to the extender straps of the plurality of extender straps comprising second elements of the side release buckles;

a plurality of webbing adjustment buckles attached to the webbing straps of the plurality of webbing straps and the extender straps of the plurality of extender straps, such that each fastener of the plurality of fasteners is paired with a respective webbing adjustment buckle of the plurality of webbing adjustment buckles, such that the webbing straps of the plurality of webbing straps and the extender straps of the plurality of extender straps are selectively length adjustable;

a shell covering the panel, such that the panel substantially occupies an internal space defined by the shell, the straps of the plurality of webbing straps being attached to the shell, the shell comprising vinyl backed canvas;

a flap attached to and extending from an upper end of the shell;

a set of top straps attached to the flap; and a plurality of couplers attached to the top straps of the set of top straps, such that each top strap is fitted with a coupler, the couplers of the plurality of couplers being selectively couplable to a frame of the vehicle, such that the flap is secured in a closing position over a gap between the windshield and a roof panel of the vehicle, wherein the flap is configured for limiting lifting of the roof panel during forward towing of the vehicle.

* * * * *